United States Patent Office 2,818,452
Patented Dec. 31, 1957

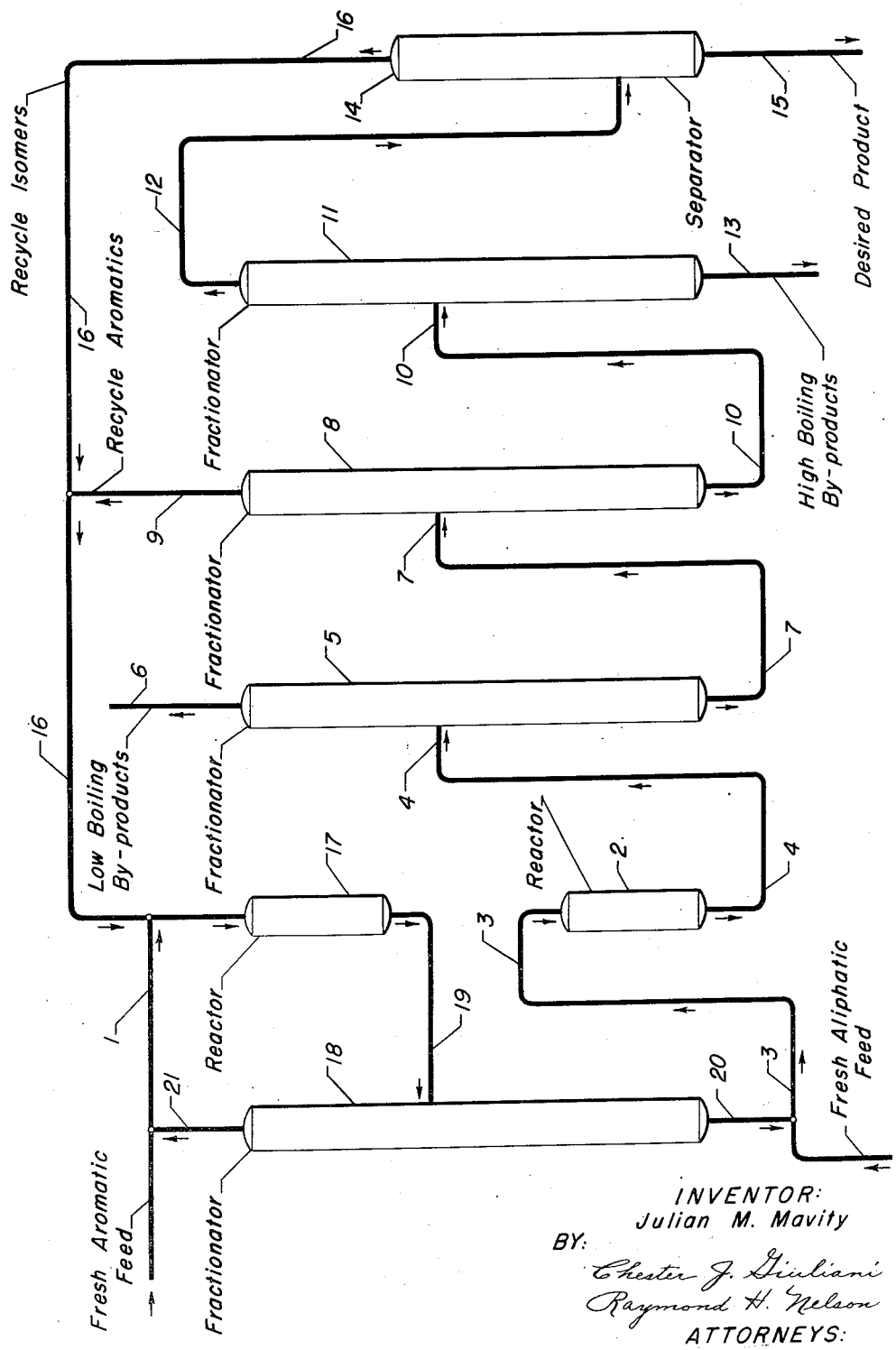

2,818,452

PREPARATION OF AROMATIC POSITION ISOMERS

Julian M. Mavity, Hinsdale, Ill., assignor to Universal Oil Products Company, Des Plaines, Ill., a corporation of Delaware Application July 23, 1956, Serial No. 599,485

10 Claims. (Cl. 260—671)

This application is a continuation-in-part of my copending application Serial No. 434,221, filed June 3, 1954, now abandoned.

This invention relates to a method for preparing alkylated aromatic compounds, and more particularly to a method of obtaining a substantial yield of desired polyalkyl aromatic hydrocarbons.

The usual methods of replacing one or more hydrogen atoms of an aromatic type nucleus by a substituent, usually an alkyl radical, result in the production of mixtures of isomers of the alkyl aromatic compound in those cases where position isomers are possible. However, in general, these methods have been unattractive from the commercial standpoint due to the fact that yields of the desired position isomers are seriously limited because of the production of sizable proportions of undesired position isomers for which there may be little or no demand. For example in the preparation of xylenes by the introduction of two methyl groups into a benzene feed, or a single methyl group into toluene, the condensation reaction results in mixtures containing o-, m- and p-xylenes. Terephthalic acid which is becoming increasingly important in commercial fields due to the fact that it is a starting material for the preparation of synthetic fibers of the glycol-terephthalate type is prepared from p-xylene. The o- and m-xylenes are undesired by-products of this alkylation and may account for a substantial portion of the yield of said condensation process. Another example of obtaining desired position isomers is the preparation of p-diisopropylbenzene which can be oxidized to obtain hydroquinone, a starting material in the preparation of inhibitors, and acetone which is used commercially as a solvent.

It is therefore an object of this invention to provide a practical method for producing improved yields of desired position isomers.

A further object of this invention is to provide a method for producing the desired alkyl isomers of aromatic type compounds by recycling the undesired isomers and the unreacted aromatic type compounds for further reaction with the alkylating agent.

One embodiment of this invention resides in a process for the preparation of a desired position isomer which comprises alkylating an alkylatable material, formed as hereinafter set forth, with an alkylating agent in a first reaction zone, passing the reaction mixture into a multiple-stage separating zone, separating the unreacted alkylatable materials from the reaction mixture and recycling the same to a second reaction zone, subsequently separating the desired position isomers in the reaction mixture, recycling the undesired position isomers to said second reaction zone along with a fresh feed alkylatable material, therein reacting the latter with said recycled undesired isomers, passing unreacted alkylatable material and reacted alkylatable material to a separation zone, separating and recycling fresh-feed alkylatable material to said second reaction zone and passing the bottoms from said separating zone to said first reaction zone.

Another embodiment of this invention concerns a process for the preparation of an aromatic position isomer which comprises reacting an aromatic material, formed as hereinafter set forth, with an alkylating agent in a first reaction zone, passing the reaction mixture into a multiple-stage separating zone, separating unreacted aromatic compounds from the reaction mixture and recycling said unreacted aromatics to a second reaction zone, subsequently separating the desired position isomers in the reaction mixture, recycling the undesired position isomers to said second reaction zone along with a fresh feed aromatic compound, therein reacting the latter with said recycled undesired isomers and said recycled unreacted aromatic compounds, passing unreacted aromatic compounds and reacted aromatic compounds to a separation zone, separating and recycling unreacted fresh-feed aromatic compounds to said second reaction zone and passing the bottoms from said separation zone to said first reaction zone.

A specific embodiment of the invention resides in a process for the preparation of p-diisopropylbenzene which comprises reacting a benzene-derived intermediate and an aliphatic feed comprising a propane-propylene mixture in the presence of a phosphoric acid composited on a solid adsorbent in a first reaction zone, passing the reaction mixture into a multiple-stage separating zone, in a first stage removing propane and propylene whereby to concentrate the reaction product, passing said reaction product into a second separating zone, removing cumene and any benzene and recycling said materials to a second reaction zone, passing the remaining reaction products into a third separating zone, removing high boiling reaction products therein, separating p-diisopropylbenzene from the remaining reaction products, recycling o- and m-diisopropylbenzenes to said second reaction zone along with a fresh benzene feed, therein reacting the latter with said recycled o- and m-diisopropylbenzenes, passing the resultant reaction mixture to a fractionator, separating and recycling unreacted fresh benzene feed to said second reaction zone and passing the bottoms from said fractionator to said first reaction zone.

Other objects and embodiments relating to alternative aromatic type compound feeds and aliphatic compound feeds will be referred to in the following further detailed description of this invention.

The method of the present invention comprises reacting a fresh aliphatic feed which is the source of the alkyl substituent to be introduced, with another fresh feed comprising an aromatic type compound, separating the desired position isomer produced thereby from the reaction mixture, and separating and recycling to a second reaction zone along with additional aromatic type fresh feed the undesired position isomers along with the unconverted aromatic type compound. Any other aromatic type compounds containing substituents which differ from the desired product only in that they contain a greater or smaller number of substituent groups per molecule may also be recycled to the aforesaid reaction zone.

An important feature of the process of this invention is the fact that it is not necessary to attain a high degree of selectivity in the isomer separation step. Heretofore this has been a requirement of prior art processes for arriving at specific isomers and has resulted in low yields. The present process requires that only a portion of the desired product be separated from the mixture. The remainder is recycled along with the undesired isomers and in the process the concentration of the desired isomers is increased to the point where it is feasible to again separate more of it from the reaction mixture.

For a better understanding of the present invention, reference will be made to the accompanying drawing which diagrammatically illustrates the flow and operation of the process of the present invention.

In a preferred embodiment of the invention an aromatic type fresh feed enters the system through line 1 and is supplied to reactor 17 together with recycle materials from line 16. A mixture of aromatic, monoalkyl- and polyalkyl aromatic compounds is withdrawn from zone 17 through line 19 to fractionator 18. The mixture is fractionated and the aromatic overhead comprising unreacted fresh feed is withdrawn through line 21 to line 1 where it is commingled with fresh aromatic feed. The higher boiling fraction, comprising monoalkyl aromatic compounds and polyalkyl aromatic compounds is withdrawn through line 20 and commingled with fresh aliphatic feed in line 3 which passed to reaction zone 2. Fresh aliphatic feed which is the source of the substituent group to be introduced into the nucleus of the aromatic compound also enters reaction zone 2 through line 3. The effluent from reaction zone 2 flows through line 4 into a multiple-stage separating zone which is represented by fractionators or separators 5, 8 and 11. Fractionator 5 is provided with line 6 whereby low boiling by-products may be taken out overhead. This is particularly useful in cases where the substituent group to be introduced into the aromatic nucleus is an alkyl group derived from an olefin used as the alkylating agent. For example, an olefin-paraffin fraction such as a propane-propylene mixture may be used as the substituent fresh feed, and the paraffin along with any unconverted olefin may be taken overhead from this column. This separation step also acts to partially concentrate the reaction products in the fractionator. The bottoms from fractionator 5 are directed through line 7 to fractionator 8 where recycle aromatics, including unreacted aromatics and aromatics containing a smaller number of substituent units than those in the desired products, are taken overhead through line 9 for recycling to reaction zone 17. The bottoms from fractionator 8 are taken through line 10 to fractionator 11 where high boiling by-products are removed through line 13 as bottoms. A mixture of the desired position isomer or isomers and the undesired position isomer or isomers is taken overhead to separator 14 where the desired product is separated and withdrawn through line 15 while the remainder of the reaction mixture, consisting mainly of undesired isomers along with traces or moderate proportions of the desired product, depending upon the efficiency of the separation stage, is returned through line 16 to reactor 17 together with the recycle aromatics from line 9.

The use of the two reaction zones, 2 and 17, in the present invention permits the use of the most favorable reaction conditions, an important condition being the most favorable ratios of reactants in each zone. For example, in reaction zone 2 the alkyl groups are introduced into the aromatic nucleus.

For purposes of illustration, using propylene and benzene as examples of the alkyl group and aromatic nucleus, the propylene will be introduced into the benzene feed and cumene which passes into said zone 2 from fractionator 18 to form isomeric diisopropylbenzenes, the latter compounds being fractionated into the various isomers as hereinbefore set forth.

The initial phase of reconverting the undesired isomers, such as o-diisopropylbenzene and m-diisopropylbenzene is initiated in reaction zone 17. This may be represented as occurring chiefly through the reaction between o- and m-diisopropylbenzene with benzene in a disproportionation reaction to form cumene, said reaction being favored by an excess of benzene. This reaction may be represented by the following equation:

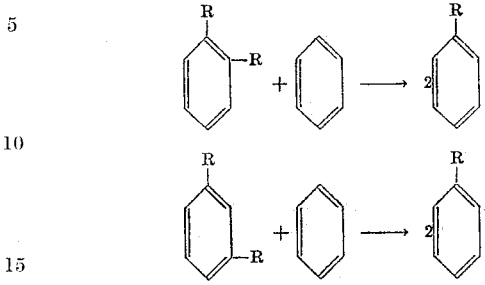

in which R represents an isopropyl radical. In addition, other reactions such as the isomerization of the diisopropylbenzenes may also take place in zone 17. The cumene, unreacted and/or isomerized diisopropylbenzenes and benzene are then fractionated as hereinbefore set forth, the unreacted benzene being recycled to zone 17, while the cumene and diisopropylbenzenes are conducted to reaction zone 2 where the cumene undergoes further alkylation with the desired alkylating agent.

It is also considered within the scope of the invention to provide means for removing impurities from the various streams when so advisable. For example, drag streams may be provided to remove any inert materials which might tend to build up in the lines or in the fractionators due to recycling. It is also within the scope of this invention to vary the flow shown in the accompanying drawing since some modifications may be desirable for the processing of different feeds or the production of different end products. A particular modification which may have some utility is applicable in those cases where one or more of the recycle isomers distills at a somewhat lower temperature than the desired isomer. In such a case it may be feasible to effect a partial separation of isomers along with the separation of the lighter recycled aromatics in fractionator 8, taking overhead for recycling a portion of this lower boiling isomeric material. Or, it may also be desirable to add a separate fractionating column to the system to effect this partial separation. It is considered within the scope of this invention that the reconversion of the undesired isomers to the desired isomers can be carried out in the same reactor system and with the same catalyst used for introducing the substituent group into the aromatic nucleus. The use of a single reactor, preferably with a number of intermediate injection points will considerably simplify the system. In addition, the use of a nuclear feed with fewer substituents than the desired product along with the recycle isomers facilitates the desired reactions particularly when a reaction zone is provided where the ratio of this nuclear feed to recycle isomers may be kept high.

The process of the present invention is applicable to the alkylation of a wide variety of alkylatable materials including "aromatic type" feeds, covering broadly mono- and polynuclear type compounds such as benzene, naphthalene, anthracene, phenanthrene, chrysene, pyrene, triphenylene, the mono- and poly-substituted analogues of the aforesaid compounds such as toluene, xylene, phenol, hydroxyanisole, anisole, α-hydroxynaphthalene, β-hydroxynaphthalene, α-methylnaphthalene, β-methylnaphthalene, α,β-dimethylnaphthalene, etc. The term "aromatic type" is also used broadly to cover not only true aromatics, but also compounds with ring systems which behave in a manner similar to the true aromatics. Thus, certain carbocyclic compounds such as azulene, and certain heterocyclic compounds such as thiophene, furan, and the like are included as aromatics to be alkylated in the present process. In certain cases, heterocyclic compounds containing a nitrogene substituent in the ring may fall within the scope of this process, but the choice of the catalyst for the introduction of the substituent group is somewhat more limited due to the basic characteristic of such nitrogen compounds.

The alkyl groups which are to be nuclearly substituted in the aromatic type compounds of the present invention can be introduced through the use of olefins, paraffin-olefin mixtures, alcohols, alkyl halides, ethers, mercaptans, diethers, etc.; such alkyl feeds including ethylene, propylene, butylene, isobutylene, amylene, etc.; ethane-ethylene, propane-propylene, butane-butylene, etc.; methanol, ethanol, propanol, butanol, etc.; methyl chloride, ethyl chloride, propyl chloride, butyl chloride, methyl bromide, ethyl bromide, propy bromide, etc.; dimethyl ether, diethyl ether, dipropyl ether, methyl ethyl ether, methyl propyl ether, ethyl propyl ether, etc.; methyl mercaptan, ethyl mercaptan, propyl mercaptan, etc.; dimethyl sulfide, diethyl sulfide, dipropyl sulfide, etc. For purposes of this invention the term "alkylating agent" will include groups other than alkyl groups, including but not limited to acyl, halo, alkenyl, etc., substituents. In the event that acyl groups are desired as the substituent to be introduced into the ring, acyl halides, acids or anhydrides can be used as the acylating agent. In addition, various other unsaturated compounds, halogen compounds and oxidated compounds may be employed for the introduction of specific substituents.

The condensation between the aromatic type compound and the alkylating or acylating agent is generally carried out in the presence of acid-acting condensation catalysts, said catalysts including acid types such as hydrogen fluoride, sulfuric acid, sulfonic acid, phosphoric acid, phosphoric acid composited on a solid siliceous adsorbent and known in the trade as solid phosphoric acid, hydrogen fluoride-bromine trifluoride, etc.; Friedel-Crafts type catalysts such as aluminum chloride, zinc chloride, ferric chloride, titanium chloride, boron fluoride, aluminum chloride-hydrogen chloride, etc.; inorganic oxide type catalysts such as silica-alumina, silica-zirconia, alumina-zirconia, silica-alumina-zirconia, certain clays and acid treated clays, etc.

The pressure and temperature conditions under which the process of the present invention operates will depend upon the particular reactants and catalysts employed; the pressures generaly being in the range of from about atmospheric to about 100 atmospheres or more, the higher pressure being desirable for the more volatile type alkylation constituents. In general, the pressure will be high enough to maintain at least one of the reactants in a liquid state. The temperature will also depend upon the alkylating agent and the catalyst employed. In general, when the liquid acid type catalysts and the more active Friedel-Crafts type catalysts are used, relatively low temperatures are employed. For example, when using aluminum chloride as a catalyst the lower operating temperatures, e. g. from about −40° to about 100° C., are generally preferred, since this metal halide has a relatively high activity, particularly in the presence of hydrogen chloride or hydrogen bromide, which is sometimes used simultaneously with a Friedel-Crafts type metal halide. When a less active catalyst such as bismuth chloride or zinc chloride is used, somewhat higher temperatures are preferred. In addition, when the inorganic oxide type catalysts are employed higher temperature, e. g., up to about 300 to 400° C. or higher are used.

The separation of the desired position isomers from the undesired isomers is shown in the accompanying sketch as taking place in separator 14. However, it is contemplated within the scope of this invention that the separation process may involve a combination of different separation techniques depending upon the particular mixture resulting from the condensation of the substituent feed and the aromatic compound feed.

Separation processes which may be used in the present invention include fractional crystallization as well as equilibrium melting. These techniques are useful when the desired position isomer has a higher melting point (or lower solubility) than the isomers from which it is to be separated. For example, in the case of disubstituted benzenes, the paraisomers frequently fall within this category. If so desired, the technique hereinbefore mentioned can be carried out in conjunction with fractional distillation. It can also be carried out with or without the presence of an extraneous solvent, which in some cases, may be preferred. One or more components of the process, that is, one or more of the feed components or one of the by-products streams may be used as the solvent. In the case of liquid mixtures refrigeration may be required for the separation when fractional crystallization is involved. Other methods of separation which may be used along or in conjunction with other techniques include fractional distillation; solvent extraction, particularly with acidic reagents such as hydrogen fluoride which can differentiate between isomers due to the differences in basicity, even in the case of some hydrocarbon isomers; selective adsorption; fractional precipitation from alkaline solutions in the case of acidic isomers such as acids or phenolic compounds; chemical separations based on differences in reaction rates of the isomer with certain reagents (e. g. sulfonation with sulfuric acid or oleum) followed by regeneration of the thus separated isomers; chemical separations based on conversion of the isomer to readily separated derivatives (e. g., sulfonates) followed by regeneration of the isomers, extractive distillation; thermal diffusion; etc.

The proposed process of this invention can be used not only for the production of certain pure isomers but also for isolating mixtures of two or more isomers from products containing a larger number, or for the purpose of excluding an undesirable isomer or isomers from a mixture thereof. For example, in the alkylation of naphthalene with a simple olefin, it is possible to produce ten different dialkyl-naphthalene position isomers. In the process of the present invention it is feasible to produce a mixture of the higher melting members of this group if so desired, and to exclude the lower melting members.

Examples of desired position isomers which may be produced by the process of this invention include p-xylene by methylating benzene or toluene; p-propyl toluene by propylating toluene; p-diethylbenzene by ethylating benzene; durene (tetramethylbenzene) by methylating benzene, toluene, xylene or trimethylbenzene; p-diisopropylbenzene by propylating benzene and/or cumene; 1,3,5-triisopropylbenzene by propylating benzene and/or cumene; p-methyldiphenyl by methylating diphenyl; p-ethyldiphenyl by ethylating diphenyl; p,p'-dimethyldiphenyl or p,p'-diethyldiphenyl by dimethylating or diethylating diphenyl; 2-t-butylhydroxyanisole by butylating hydroxyanisole, etc.

It is also contemplated within the scope of this invention that the principles disclosed herein need not necessarily be limited to the production of aromatic type position isomers but may be extended to the production of various isomeric compounds including purely aliphatic as well as naphthenic types. For example, the method may be applicable in the esterification of certain polybasic acids, or in the esterification or etherification of certain polyhydroxy compounds to produce specific isomers.

The present invention is further illustrated with respect to specific embodiments thereof in the following examples which, however, are not intended to limit the generally broad scope of the present invention in strict accordance therewith.

*Example I*

A benzene stream and an independent liquified propane-propylene feed were pumped through a preheater and into a reactor containing 140 grams of phosphoric acid composited on a solid adsorbent. The temperature of the reactor was approximately 450° F. and the pressure about 500 p. s. i. g. The benzene was fed into the reactor at an LHSV of 0.095 while the propane-propylene feed into the reaction had an LHSV of 0.704. The reactor effluent was discharged into a fractionating column where propane and unreacted propylene were separated therefrom. The remaining components of the reaction mixture were taken from the bottom of this separator and directed into a second fractionating column. A stream comprising cumene and unreacted benzene was taken overhead from this fractionating column to a line for recycling. The liquid bottoms from this fractionating column were withdrawn from the bottom of the fractionator and directed to a third fractionation column where bottoms boiling above the diisopropylbenzenes were removed. The overhead from this mixture, consisting of a mixture of o-, m- and p-diisopropylbenzenes is taken to a separation zone where separation of the two low boiling isomers, that is the o-, and m-isomers, from the higher boiling p-isomer may be effected. The overhead o- and m- concentrate which also contains a minor proportion of the p-isomer is recycled to the reactor along with the cumene and benzene which had been taken off in the second fractionator columns as overhead. The bottoms from the separation zone which comprise a concentrate rich in the p-diisopropylbenzene are led to another separation zone for the separation of the pure p-diisopropylbenzene. This separation may be done by fractional crystallization at a low temperature, said crystallization being facilitated by using a portion of the propane-propylene feed as a solvent which, after being used, is recycled to the reactor along with other constituents of the mother liquor. The p-diisopropylbenzene having a melting point of −17.07° C., as compared to −56.68° C. for the o- and −63.13° C. for the m-isomer is crystallized from the mixture in a high degree of purity.

*Example II*

A stream of toluene and an independent methanol stream is pumped through a preheater into a jacketed reactor containing a catalyst comprising aluminum chloride, the temperature of said reactor being maintained at approximately 250° F. and at a pressure of 500 p. s. i. g. The reactor effluent is discharged into a first fractionating column where methanol is separated therefrom as overhead. The remaining components are taken from the bottom of this fractionating column and directed into a second fractionating column where a stream of unreacted toluene is taken overhead into a line for recycling. The liquid bottoms are withdrawn and directed to a third fractionating column where bottoms boiling above the xylene range are removed. The overhead, consisting of a mixture of o-, m- and p-xylenes is taken to a separation zone where said xylenes are separated. The o- and m-xylenes along with a minor amount of p-xylenes are recycled to a second reactor along with the toluene taken off in the second fractionator, while the concentrate rich in p-xylene is led to another separation zone where the p-xylene may be separated out as a pure product.

I claim as my invention:

1. A process for the preparation of a desired position isomer which comprises alkylating an alkylatable aromatic material, formed as hereinafter set forth, with an alkylating agent in a first reaction zone, passing the reaction mixture into a multiple-stage separating zone, separating the unreacted alkylatable materials from the reaction mixture and recycling the same to a second reaction zone, subsequently separating the desired position isomer in the reaction mixture, recycling the undesired position isomers to said second reaction zone along with a fresh feed alkylatable aromatic material, therein reacting the latter with said recycled undesired isomers, passing unreacted alkylatable material and reacted alkylatable material to a separation zone, separating and recycling fresh-feed alkylatable material to said second reaction zone and passing the bottoms from said separating zone to said first reaction zone.

2. A process for the preparation of an aromatic position isomer which comprises reacting an aromatic material, formed as hereinafter set forth, with an aliphatic compound in a first reaction zone, separating the desired position isomer from the reaction mixture, recycling the undesired position isomers to a second reaction zone along with a fresh-feed aromatic compound, therein reacting the latter with said recycled isomers, passing said material into a separation zone, separating and recycling said unreacted fresh-feed aromatic compound to said second reaction zone and passing the bottoms from said separation zone to said first reaction zone.

3. A process for the preparation of an aromatic position isomer which comprises reacting an aromatic material, formed as hereinafter set forth, with an aliphatic compound in a first reaction zone, passing the reaction mixture into a multiple-stage separating zone, separating unreacted aromatic compounds from the reaction mixture and recycling said unreacted aromatics to a second reaction zone, subsequently separating the desired position isomer in the reaction mixture, recycling the undesired position isomers to said second reaction zone along with a fresh-feed aromatic compound, therein reacting the latter with said recycled undesired isomers, passing the resultant reaction mixture into a separation zone, separating and recycling said unreacted fresh-feed aromatic compounds to said second reaction zone, and passing the bottoms from said separation zone to said first reaction zone.

4. A process for the preparation of an aromatic position isomer which comprises reacting an aromatic material, formed as hereinafter set forth, with an aliphatic compound in a first reaction zone, passing the reaction mixture into a multiple-stage separation zone, in a first stage removing undesired low boiling material whereby to concentrate the reaction product, separating unreacted aromatic compound from the remaining reaction mixture in a second separating zone and recycling said unreacted aromatic compound to a second reaction zone, subsequently separating the desired position isomer from the resulting concentrated reaction mixture, recycling the undesired position isomers to said second reaction zone along with a fresh-feed aromatic compound, therein reacting the latter with said recycled undesired isomers, passing the resultant reaction mixture to a separation zone, separating and recycling said unreacted fresh-feed aromatic compounds to said second reaction zone and passing the bottoms from said separation zone to said first reaction zone.

5. A process as set forth in claim 4 in which the reaction between the aromatic material and the aliphatic compound in said first reaction zone is carried out in the presence of an acid-acting catalyst.

6. A process as set forth in claim 5 in which said catalyst comprises a phosphoric acid composited on a solid adsorbent.

7. A process as set forth in claim 5 in which said catalyst comprises aluminum chloride.

8. A process as set forth in claim 5 in which said catalyst comprises hydrogen fluoride.

9. A process for the preparation of p-diisopropylbenzene which comprises reacting a benzene-derived intermediate formed in the process with an aliphatic feed comprising a propane-propylene mixture in the presence of a phosphoric acid composited on a solid adsorbent in a first reaction zone, passing the reaction mixture into a multiple-stage separating zone, in a first stage removing propane and unreacted propylene whereby to concentrate the reaction product, passing said reaction product into a second separating zone, removing cumene and recycling said cumene to a second reaction zone, passing the remaining reaction products into a third separating zone, removing high boiling reaction products therein, separating p-diisopropylbenzene from the remaining reaction products, recycling o- and m-diisopropylbenzenes to said second reaction zone along with a fresh benzene feed, therein reacting the latter with said recycled o- and m-diisopropylbenzenes, passing the reaction products to a fractionator, separating and recycling unreacted fresh benzene feed to said second reaction zone and passing the bottoms from said fractionator to said first reaction zone.

10. A process for the preparation of p-xylene which comprises reacting a toluene-containing intermediate formed in the process by the reaction of benzene with methanol in a first reaction zone in the presence of aluminum chloride, passing the reaction mixture into a multiple-stage separating zone, in a first stage removing methanol whereby to concentrate the reaction products, passing said products into a second separating stage, separating unreacted toluene from the reaction mixture and recycling said toluene to a second reaction zone, passing the remaining reaction products to a third separating stage, removing trimethylbenzene, passing the remaining reaction products to a fourth separating stage and therein separating p-xylene from o- and m-xylene, recycling said o- and m-xylene to said second reaction zone along with a fresh benzene feed, therein reacting the latter with said recycled toluene, benzene, and recycled o- and m-xylene, passing the resultant reaction mixture to a fractionator, separating and recycling said unreacted fresh benzene feed to said second reaction zone and passing the bottoms from said fractionator to said first reaction zone.

References Cited in the file of this patent

UNITED STATES PATENTS

| | | |
|---|---|---|
| 2,143,493 | Stanley et al. | Jan. 10, 1939 |
| 2,395,198 | Schulze | Feb. 19, 1946 |
| 2,396,682 | Carmody | Mar. 19, 1946 |
| 2,396,683 | Carmody | Mar. 19, 1946 |
| 2,421,331 | Johnson | May 27, 1947 |
| 2,438,211 | Gorin | Mar. 23, 1948 |
| 2,730,557 | Max et al. | Jan. 10, 1956 |
| 2,744,150 | Enos | May 1, 1956 |
| 2,756,261 | Fetterly | July 24, 1956 |

FOREIGN PATENTS

| | | |
|---|---|---|
| 1,088,332 | France | Sept. 8, 1954 |